(12) United States Patent
Chaya

(10) Patent No.: US 11,400,757 B2
(45) Date of Patent: Aug. 2, 2022

(54) PNEUMATIC TIRE AND METHOD FOR MANUFACTURING SAME

(71) Applicant: The Yokohama Rubber Co., LTD., Tokyo (JP)

(72) Inventor: Hitomi Chaya, Hiratsuka (JP)

( * ) Notice: Subject to any disclaimer, the term of this patent is extended or adjusted under 35 U.S.C. 154(b) by 215 days.

(21) Appl. No.: 16/475,046

(22) PCT Filed: Dec. 27, 2017

(86) PCT No.: PCT/JP2017/046989
§ 371 (c)(1),
(2) Date: Jun. 28, 2019

(87) PCT Pub. No.: WO2018/163577
PCT Pub. Date: Sep. 13, 2018

(65) Prior Publication Data
US 2019/0329601 A1  Oct. 31, 2019

(30) Foreign Application Priority Data
Mar. 10, 2017  (JP) .............................. JP2017-045614

(51) Int. Cl.
  *B60C 15/02*  (2006.01)
  *B60C 15/06*  (2006.01)
  (Continued)

(52) U.S. Cl.
  CPC ............ *B60C 3/04* (2013.01); *B29D 30/0601* (2013.01); *B60C 15/02* (2013.01); *B60C 2013/007* (2013.01); *B60C 2015/061* (2013.01)

(58) Field of Classification Search
  CPC ................ B60C 3/04; B60C 2015/061; B60C 2015/0245; B60C 15/024; B60C 15/02; B60C 2013/007
  See application file for complete search history.

(56) References Cited

U.S. PATENT DOCUMENTS 4,662,416 A * 5/1987 Yagi .......................... B60C 3/04
                                                          152/209.14
4,721,143 A * 1/1988 Fukushima ............... B60C 3/04
                                                          152/454

(Continued)

FOREIGN PATENT DOCUMENTS

DE   19715866 A1 * 10/1998 ............. B60B 21/04
EP     119152 A  *  9/1984 ........... B60C 1/0016

(Continued)

OTHER PUBLICATIONS

Machine Translation: JP-2012176694-A, Ono, Yasuaki, (Year: 2021).*

(Continued)

*Primary Examiner* — Kendra Ly
(74) *Attorney, Agent, or Firm* — Thorpe North & Western

(57) ABSTRACT

A pneumatic tire includes an annular tread portion extending in a tire circumferential direction, a pair of sidewall portions disposed on both sides of the tread portion, and a pair of bead portions disposed inward of the sidewall portions in a tire radial direction, and the sidewall portions have an average thickness set to range from 1.0 mm to 3.0 mm at a deflection region of each sidewall portion including a tire maximum width position. The bead portions have a bead base width set to range from 115% to 130% of a tread development width of the tread portion.

2 Claims, 3 Drawing Sheets

(51) Int. Cl.
  *B60C 13/00*   (2006.01)
  *B29D 30/06*   (2006.01)
  *B60C 3/04*    (2006.01)

(56) References Cited

U.S. PATENT DOCUMENTS

| | | | | |
|---|---|---|---|---|
| 5,385,192 | A * | 1/1995 | Hashimura | B60C 13/00 |
| | | | | 152/523 |
| 5,386,863 | A * | 2/1995 | Hashimura | B60C 13/00 |
| | | | | 152/523 |
| 6,213,182 | B1 * | 4/2001 | Hanya | B60C 3/04 |
| | | | | 152/454 |
| 6,250,352 | B1 * | 6/2001 | Ishikawa | B60C 3/00 |
| | | | | 152/209.11 |
| 6,367,526 | B1 * | 4/2002 | Hubbell, Jr. | B60C 13/003 |
| | | | | 152/209.1 |
| 6,752,186 | B1 | 6/2004 | Ueyoko | |
| 2002/0151636 | A1 * | 10/2002 | Wada | C08L 21/00 |
| | | | | 524/445 |
| 2005/0103419 | A1 * | 5/2005 | Yamamoto | B60C 13/00 |
| | | | | 152/557 |
| 2007/0029022 | A1 * | 2/2007 | Tanaka | B60C 15/06 |
| | | | | 152/555 |
| 2013/0240107 | A1 * | 9/2013 | Ebiko | B60C 15/0603 |
| | | | | 152/541 |
| 2014/0090765 | A1 * | 4/2014 | Shima | B60C 15/02 |
| | | | | 152/539 |
| 2014/0238569 | A1 * | 8/2014 | Ferigo | B60C 9/0292 |
| | | | | 152/454 |
| 2014/0345770 | A1 | 11/2014 | Kurita | |
| 2017/0274710 | A1 | 9/2017 | Matsumoto et al. | |

FOREIGN PATENT DOCUMENTS

| | | | |
|---|---|---|---|
| JP | S51-141101 | | 12/1976 |
| JP | S58-096927 | | 7/1983 |
| JP | S58-100101 | | 7/1983 |
| JP | H08-142602 | | 6/1996 |
| JP | 2001-113920 | | 4/2001 |
| JP | 2005-022279 | | 1/2005 |
| JP | 2006213241 A | * | 8/2006 |
| JP | 2010-036598 | | 2/2010 |
| JP | 2012-176694 | | 9/2012 |
| JP | 2012176694 A | * | 9/2012 |
| JP | 2013154765 A | * | 8/2013 |
| JP | 2014-240171 | | 12/2014 |
| JP | 2015-036262 | | 2/2015 |
| JP | 2015-174594 | | 10/2015 |
| JP | 2015-189253 | | 11/2015 |
| JP | 2016-068682 | | 5/2016 |
| WO | WO 2013/111576 | | 8/2013 |
| WO | WO 2016/035840 | | 3/2016 |

OTHER PUBLICATIONS

Machine Translation: JP-2006213241-A, Suzuki, Hiroyuki, (Year: 2021).*
Machine Translation: JP-2013154765-A, Ito T, (Year: 2022).*
Machine Translation: DE-19715866-A1, Baumgarten R, (Year: 2022).*
International Search Report for International Application No. PCT/JP2017/046989 dated Apr. 3, 2018, 4 pages, Japan.

* cited by examiner

PNEUMATIC TIRE AND METHOD FOR MANUFACTURING SAME

TECHNICAL FIELD

The present technology relates to a pneumatic tire including sidewall portions thinned in order to reduce a vertical spring constant and a method for manufacturing the pneumatic tire. More specifically, the present technology relates to a pneumatic tire capable of favorably maintaining mountability on rims even with thinned sidewall portions, and a method for manufacturing the pneumatic tire.

BACKGROUND ART

A pneumatic tire includes an annular tread portion extending in the tire circumferential direction, a pair of sidewall portions disposed on both sides of the tread portion, and a pair of bead portions disposed inward of the sidewall portions in the tire radial direction. For such a pneumatic tire, for example, there is a demand for a reduction in vertical spring constant in order to improve ground contact and ride comfort.

One possible approach to reducing the vertical spring rate of the pneumatic tire is to reduce the thickness of the sidewall portions (for example, see Japan Unexamined Patent Publication Nos. 2015-036262, 2015-174594 and 2015-189253). However, in a case where the sidewall portions are thinned, the rigidity of the sidewall portions decreases, disadvantageously leading to degraded mountability on rims. In other words, with reduced rigidity, the sidewall portions are likely to deform the sidewall portions and reduce the spacing between the bead portions. This makes fitting the bead portions to a rim difficult.

In order to improve tire characteristics in traveling conditions, known pneumatic tires include bead portions having a bead base width set larger than a rim width (for example, see Japan Examined Patent Utility Model Publication Nos. S58-96927 and S58-100101). However, the setting of these pneumatic tires is not intended to improve the mountability on rims, and at present, the mountability on rims is not always improved by simply making the bead base width larger than the rim width.

SUMMARY

The present technology provides a pneumatic tire capable of favorably maintaining mountability on rims even with thinned sidewall portions, and a method for manufacturing the pneumatic tire.

According to an embodiment of the present technology, a pneumatic tire is provided, the pneumatic tire including an annular tread portion extending in a tire circumferential direction, a pair of sidewall portions disposed on both sides of the tread portion, and a pair of bead portions disposed inward of the sidewall portions in a tire radial direction, the sidewall portions having an average thickness set to range from 1.0 mm to 3.0 mm at a deflection region of each sidewall portion including a tire maximum width position, the bead portions having a bead base width TBW set to range from 115% to 130% of a tread development width TDW of the tread portion.

Furthermore, according to an embodiment of the present technology, a method for manufacturing a pneumatic tire is provided, the pneumatic tire including an annular tread portion extending in a tire circumferential direction, a pair of sidewall portions disposed on both sides of the tread portion, and a pair of bead portions disposed inward of the sidewall portions in a tire radial direction, the sidewall portions having an average thickness set to range from 1.0 mm to 3.0 mm at a deflection region of each sidewall portion including a tire maximum width position, the method including vulcanizing the pneumatic tire in a mold formed such that the bead portions have a bead base width TBW set to range from 115% to 130% of a tread development width TDW of the tread portion.

In the present technology, the sidewall portions have an average thickness set to range from 1.0 mm to 3.0 mm at the deflection region of each sidewall portion including the tire maximum width position, and the bead portions have the bead base width TBW set to range from 115% to 130% of the tread development width TDW of the tread portion. Thus, mountability on rims can be favorably maintained even with the thinned sidewall portions. In other words, the annular tread portion is a stable structure with little deformation in the tire lateral direction. Thus, in a case where the bead base width TBW of the bead portion is set to a large value in a predetermined ratio to the tread development width TDW of the tread portion, a sufficient spacing is ensured between the bead portions before the tire is sufficiently inflated, and enabling a rim mounting operation can be performed smoothly.

In the present technology, both the bead base width TBW and the tread development width TDW are dimensions in the mold. Thus, in a case where the pneumatic tire is manufactured in which the sidewall portions have an average thickness ranging from 1.0 mm to 3.0 mm at the deflection region of each sidewall portion including the tire maximum width position as described above, the pneumatic tire is vulcanized in the mold formed such that each bead portion has the bead base width TBW ranging from 115% to 130% of the tread development width TDW of the tread portion. Note that "deflection region of each sidewall portion including the tire maximum width position" refers to a region corresponding to 20% of a tire cross-sectional height SH centered at the tire maximum width position.

In the present technology, the bead base width TBW is preferably 1 inch to 3 inches larger than the rim width RW of a standard rim. Making the bead base width TBW larger than the rim width RW of the standard rim also contributes to improving mountability on rims. In a case of manufacturing such a pneumatic tire, it is sufficient to form the mold so that the bead base width TBW is 1 inch to 3 inches larger than the rim width RW of the standard rim.

Additionally, a bead filler embedded in each of the bead portions preferably has a height of 30% or less of the tire cross-sectional height. Accordingly, the vertical spring constant of the pneumatic tire can be further reduced with mountability on rims favorably maintained.

DETAILED DESCRIPTION

Figure 1:
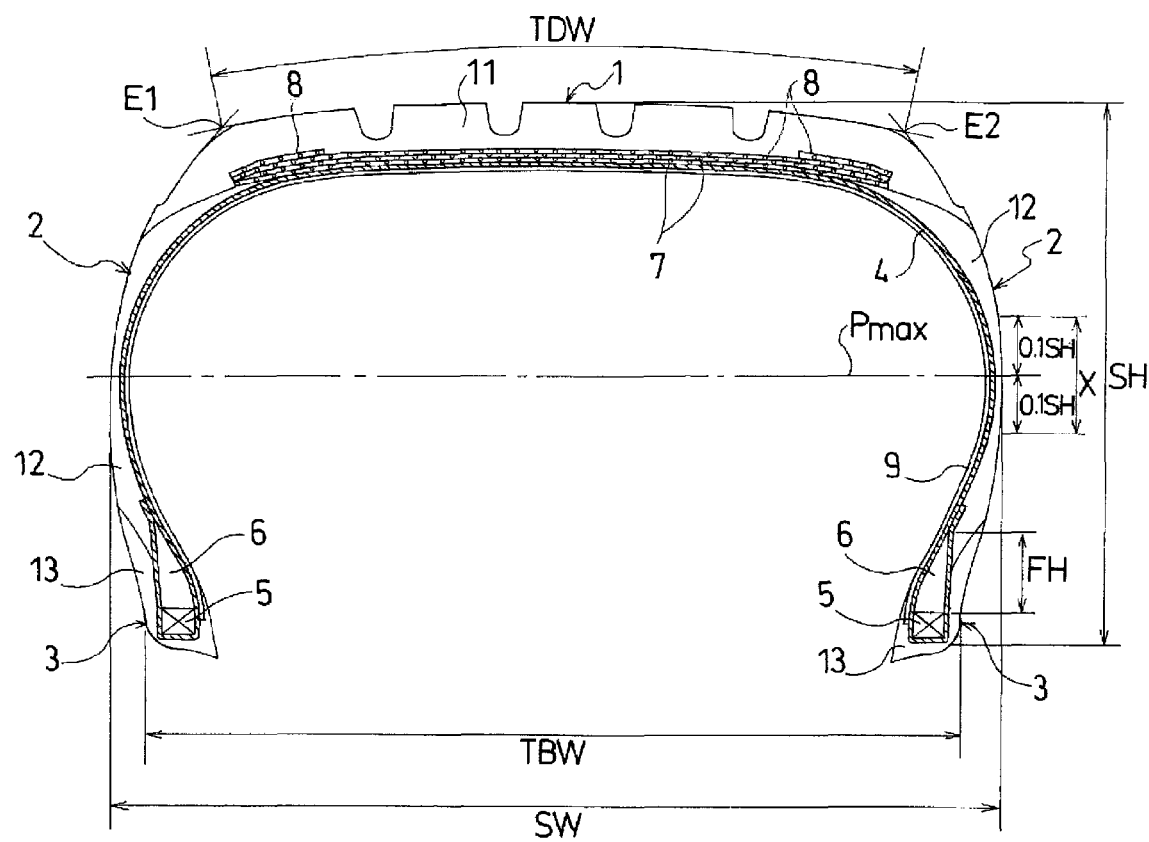
FIG. 1 is a meridian cross-sectional view illustrating a pneumatic tire according to an embodiment of the present technology.
Figure 2:
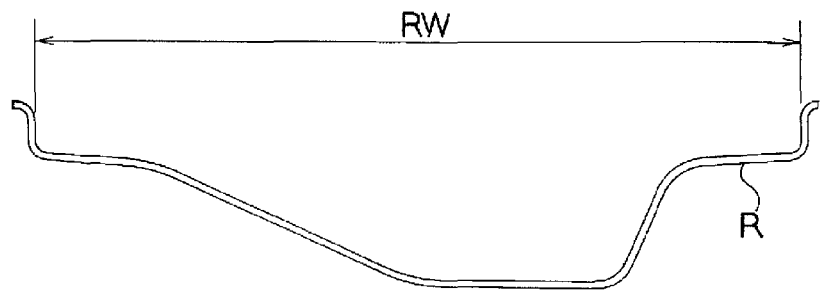
FIG. 2 is a meridian cross-sectional view illustrating a standard rim to which a pneumatic tire according to an embodiment of the present technology is assembled.

Configurations of embodiments of the present technology will be described in detail below with reference to the accompanying drawings. FIG. 1 illustrates a tread pattern of a pneumatic tire according to an embodiment of the present technology, and FIG. 2 illustrates a standard rim to which the pneumatic tire is assembled.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. Organic fiber cords of nylon, polyester, or the like are preferably used as reinforcing cords for the carcass layer 4. A bead filler 6 having a triangular cross-sectional shape formed from rubber composition is disposed on the outer circumference of the bead core 5. Additionally, on a tire inner surface, an innerliner layer 9 is disposed along the carcass layer 4.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Furthermore, a tread rubber layer 11 is disposed outward of the belt cover layer 8 in the tread portion 1. A sidewall rubber layer 12 is disposed outward of the carcass layer 4 in each of the sidewall portions 2. A rim cushion rubber layer 13 is disposed outward of the carcass layer 4 in each of the bead portions 3. Note that the tire internal structure described above represents a typical example for a pneumatic tire, and the pneumatic tire is not limited thereto.

In the pneumatic tire described above, the sidewall portion 2 has an average thickness set to range from 1.0 mm to 3.0 mm, and more preferably, from 1.5 mm to 2.5 mm, at a deflection region X of the sidewall portion 2 including a tire maximum width position Pmax. The deflection region X of the sidewall portion 2 including the tire maximum width position Pmax is a region corresponding to 20% of the tire cross-sectional height SH centered at the tire maximum width position Pmax. The average thickness is the average value of the thickness of the sidewall portion 2 including the carcass layer 4, the innerliner layer 9, and the sidewall rubber layer 12 as measured at the deflection region X along the normal line direction of a tire outer surface.

By reducing the average thickness of the sidewall portion 2 at the deflection region X including the tire maximum width position Pmax in this manner, a vertical spring constant of the pneumatic tire can be reduced, allowing ground contact and ride comfort to be improved. Here, when the average thickness at the deflection region X is less than 1.0 mm, the function of the tire is degraded. On the other hand, when the average thickness is greater than 3.0 mm, the reduction in the vertical spring constant is insufficient.

However, reducing the thickness of the sidewall portions 2 reduces the rigidity of the sidewall portions 2, and thus tends to degrade mountability on rims. Thus, in the pneumatic tire described above, the bead base width TBW of the bead portions 3 is set to range from 115% to 130%, and more preferably, from 115% to 120%, of the tread development width TDW of the tread portion 1. The bead base width TBW is the width of the bead base between the pair of bead portions 3, 3 measured with respect to a surface of each bead portion 3 abutting a rim flange. The tread development width TDW is a the distance from a tread edge E1 to a tread edge E2 measured along a profile of a road contact surface of the tread portion 1; in a tire meridian cross section, the tread edge E1 and the tread edge E2 are each defined as an intersection point between an extension line of an arc defining a profile of a shoulder region on a corresponding one of both sides of the tread portion 1 and an extension line of an arc defining a profile of a buttress region on the corresponding side of the tread portion 1, the buttress region being separated from a ground contact region of the tread portion 1.

By setting the bead base width TBW of the bead portion 3 sufficiently larger than the tread development width TDW of the tread portion 1 in this manner, mountability on rims can be favorably maintained even with the thinned sidewall portions 2. Here, when the bead base width TBW is less than 115% of the tread development width TDW, the effect of enhancing mountability on rims is insufficient. On the other hand, when the bead base width TBW is more than 130% of the tread development width TDW, the shape of the tire is distorted, making delivery of desired tire performance difficult.

In the pneumatic tire described above, the bead base width TBW is larger than a rim width RW of a standard rim R (see FIG. 2), and the difference between the bead base width TBW and the rim width RW is preferably set to range from 1 inch (25.4 mm) to 3 inches (76.2 mm). Making the bead base width TBW larger than the rim width RW of the standard rim contributes to improving mountability on rims. When the bead base width TBW is larger than the rim width RW by less than 1 inch, the effect of enhancing mountability on rims is reduced. On the other hand, when the bead base width TBW is larger than the rim width RW by more than 3 inches, the shape of the tire is distorted, making delivery of the desired tire performance difficult.

Additionally, in the pneumatic tire described above, the bead base width TBW of the bead portion 3 is preferably set to range from 85% to 94% of the tire cross-sectional width SW. Thus, mountability on rims can be favorably maintained. Here, when the bead base width TBW is less than 85% of the tire cross-sectional width SW, the effect of enhancing mountability on rims is reduced. On the other hand, when the tire cross-sectional width SW is more than 94% of the tire cross-sectional width SW, the shape of the tire is distorted, making delivery of the desired tire performance difficult.

Furthermore, in the pneumatic tire described above, the bead filler 6 embedded in each of the bead portions 3 preferably has a height FH set to 30% or less, and more preferably, from the range of 5% to 25% of the tire cross-sectional height SH. Accordingly, the vertical spring constant of the pneumatic tire can be further reduced with mountability on rims favorably maintained. Note that the bead filler 6 can be eliminated from the bead portion 3.

Furthermore, in the pneumatic tire described above, in order to reduce the vertical spring constant, for example, a rubber composition having a JIS hardness ranging from 52 to 53 as defined in JIS K-6253 is effectively used as a rubber composition constituting the sidewall rubber layer 12.

Figure 3:
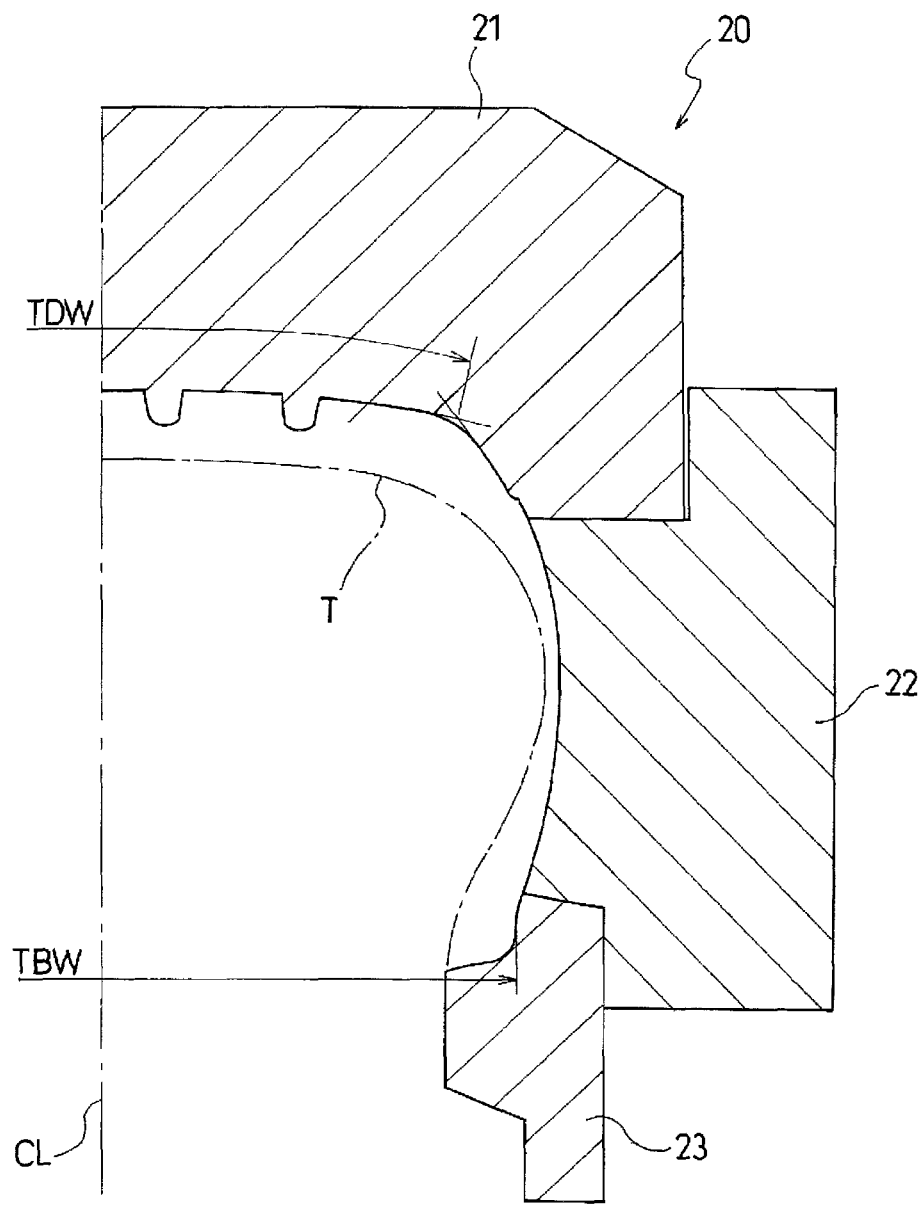
FIG. 3 is a meridian cross-sectional view illustrating a mold used to vulcanize a pneumatic tire according to an embodiment of the present technology.

FIG. 3 illustrates a mold used to vulcanize a pneumatic tire according to an embodiment of the present technology. In FIG. 3, CL denotes a tire centerline, and T denotes a tire. As illustrated in FIG. 3, a mold 20 includes a sector mold 21 for forming the tread portion 1 of the tire T, a side plate 22 for forming the sidewall portion 2 of the tire T, and a bead ring 23 for forming the bead portion 3 of the tire T. During vulcanization, a rubber bladder is inserted inside the tire T, and inflation of the bladder causes the tire T to be pressed against an inner surface of the mold 20.

The mold 20 configured in this manner is processed so that the bead base width TBW of the tire T is in the above-described predetermined ratio to the tread development width TDW. Similarly, the mold 20 is processed so that the bead base width TBW of the tire T is in the above-described predetermined ratio to the rim width RW of the standard rim R or the tire cross-sectional width SW.

A pneumatic tire as illustrated in FIG. 1 can be manufactured by vulcanizing the tire T in the mold 20 formed such that the bead base width TBW is in the predetermined ratio to the tread development width TDW.

EXAMPLES

Pneumatic tires according to a Conventional Example, according to Comparative Example 1, and according to Examples 1 to 4 were manufactured. The pneumatic tires have a tire size of 205/60R16 and have the following values set as illustrated in Table 1: the average thickness of the sidewall portion at the deflection region including the tire maximum width position, the tread development width TDW, the bead base width TBW, the ratio of the developed tread width TDW to the bead base width TBW (TBW/TDW×100%), and the ratio of the bead filler height FH to the tire cross-sectional height SH (FH/SH×100%). The rim width RW of the standard rim for the pneumatic tire is 6.0 inches (153 mm).

These test tires were evaluated for mountability on rims and the vertical spring constant according to the following evaluation method, and the results are also shown in Table 1.

Mountability on Rims:

The working time taken to assemble each test tire to the standard rim was measured. The evaluation results were expressed, using the reciprocal of the measurement values, as index values with the value of the Conventional Example being defined as 100. Larger index values indicate more favorable mountability on rims.

Vertical Spring Constant:

Each test tire was assembled to the standard rim and inflated to an air pressure of 240 kPa before the vertical spring constant was measured. Evaluation results are expressed as index values with the value of the Conventional Example being defined as 100. Smaller index values indicate smaller vertical spring constants.

TABLE 1

|  | Conventional Example | Comparative Example 1 | Example 1 |
|---|---|---|---|
| Average thickness at deflection region of sidewall portion (mm) | 3.5 | 2.5 | 2.5 |
| Tread development width TDW (mm) | 170 | 172 | 172 |
| Bead base width TBW (mm) | 191 | 190 | 203 |
| TBW/TDW × 100% | 112 | 110 | 118 |
| FH/SH × 100% | 30 | 30 | 30 |
| Mountability on rims (index value) | 100 | 80 | 100 |
| Vertical spring constant (index value) | 100 | 97 | 97 |

|  | Example 2 | Example 3 | Example 4 |
|---|---|---|---|
| Average thickness at deflection region of sidewall portion (mm) | 1.5 | 2.5 | 2.5 |
| Tread development width TDW (mm) | 172 | 172 | 172 |
| Bead base width TBW (mm) | 203 | 216 | 203 |
| TBW/TDW × 100% | 118 | 126 | 118 |
| FH/SH × 100% | 30 | 30 | 25 |
| Mountability on rims (index value) | 99 | 100 | 100 |
| Vertical spring constant (index value) | 95 | 97 | 95 |

As is clear from Table 1, in contrast to the tire of the Conventional Example, the tires of Examples 1 to 4 were all set to have a reduced sidewall portion thickness and a reduced vertical spring constant but exhibited favorable mountability on rims. On the other hand, the tire of Comparative Example 1 exhibited significantly degraded mountability on rims due to a reduced sidewall portion thickness and a reduced vertical spring constant.

The invention claimed is:

1. A pneumatic tire, comprising:
   an annular tread portion extending in a tire circumferential direction;
   a pair of sidewall portions disposed on both sides of the tread portion;
   and
   a pair of bead portions disposed inward of the sidewall portions in a tire radial direction, the bead portions include a bead core and a bead filler radially outward of the bead core;
   the sidewall portions having an average thickness set to range from 1.0 mm to 3.0 mm at a deflection region of each sidewall portion including a tire maximum width position;
   the bead filler having a height of from 20% to 30% of a tire-cross-sectional height; and
   the bead portions having a bead base width set to range from 115% to 130% of a tread development width of the tread portion;
   wherein the pneumatic tire is mounted on a standard rim, and the bead base width is 1 inch to 3 inches larger than a rim width of the standard rim.

2. A method for manufacturing a pneumatic tire comprising an annular tread portion extending in a tire circumferential direction, a pair of sidewall portions disposed on both sides of the tread portion, and a pair of bead portions disposed inward of the sidewall portions in a tire radial direction, the bead portions including a bead core and a bead filler radially outward of the bead core, the sidewall portions having an average thickness set to range from 1.0 mm to 3.0 mm at a deflection region of each sidewall portion including a tire maximum width position, the bead filler having a height of from 20% to 30% of a tire-cross-sectional height, the method comprising:

vulcanizing the pneumatic tire in a mold formed such that the bead portions have a bead base width set to range from 115% to 130% of a tread development width of the tread portion;

wherein the mold is formed such that the bead base width is 1 inch to 3 inches larger than a rim width of a standard rim.

* * * * *